Figure 1:
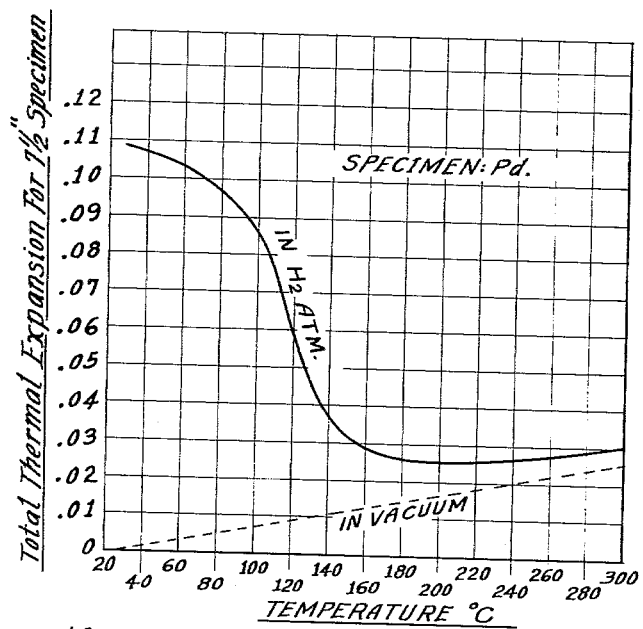

Sept. 28, 1965

L. R. RUBIN 3,208,198

METHOD FOR HYDROGEN DIFFUSION

Filed July 26, 1962

INVENTOR.
Leonard R. Rubin
BY
Samuel Kahn
ATTORNEY

United States Patent Office 3,208,198
Patented Sept. 28, 1965

3,208,198
METHOD FOR HYDROGEN DIFFUSION
Leonard R. Rubin, Union, N.J., assignor to Engelhard Industries, Inc., Newark, N.J., a corporation of Delaware
Filed July 26, 1962, Ser. No. 212,601
2 Claims. (Cl. 55—16)

This invention relates to the separation and purification of hydrogen and, in particular, is concerned with an improved method of operating diffusion aparatus wherein hydrogen is purified by permeation through non-porous metal barriers.

The method of separating hydrogen from gaseous mixtures and purifying hydrogen by permeating hydrogen through thin non-porous metal barriers of palladium or palladium alloys, is well known. A variety of techniques have been hitherto devised for effecting such processes. For example, it is known to use thin tubes of hydrogen-permeable metal as the barrier means, the hydrogen-containing gases being contacted with one side of such tubes and pure diffused hydrogen being removed from the other side. Generally, hydrogen diffusion processes are effected at elevated temperatures and conditions which establish a hydrogen pressure differential across the diffusion barrier.

As an alternative to the use of thin metal tubes for diffusion separation and/or purification of hydrogen, techniques have been devised which employ thin sheets or foils of hydrogen-permeable metal. Procedures and apparatus have been disclosed in the art of positioning or disposing such thin metal films or foils in suitable diffusion apparatus, including means for reinforcing or supporting such thin films and foils so as to make practicable operating pressure differentials across such foil barriers of the order of several hundred pounds. For example, U.S. Patent No. 1,174,631 of Snelling discloses the use of thin platinum or palladium sheets disposed or supported upon porous backing materials such as porous earthenware or Alundum. Porous backings which are sandwiched between suitable foil diffusion barriers are disclosed in U.S. Patent No. 2,958,391 of A. J. de Rosset.

In general, foil-type diffusers are assembled having one or more foils supported by a porous backing and sealed or gasketed around the peripherical edges of the foil to provide a leak-tight structure. Such diffusion apparatus is provided with inlet means for introducing hydrogen-containing gases to one side of the permeable foil or barrier, and outlet means for removing pure hydrogen which diffuses through the hydrogen-permeable barrier.

At the present time, commercial diffusion purification of hydrogen is generally carried out through tubing of palladium or its alloys. It has been found that tubing with at least about 3 to 4 mils (0.003–0.004 inch) of wall thickness is necessary to be initially free of leakage and to remain free from leakage for a reasonable period of time. Suitable apparatus for such purpose is disclosed and claimed in Green, U.S. Patent No. 2,911,057.

A typical installation for hydrogen diffusion through palladium-25% silver alloy tubing may use, for example, 25 feet of 4-mil tubing of ⅛-inch diameter. Operation of such a unit at 450° and 150 p.s.i.g. inlet $H_2$ pressure will supply pure hydrogen gas at a rate of 27—30 s.c.f.h. (standard cubic feet per hour). About 114 square inches of diffusion cross section are provided, and about 2.70 troy ounces of the alloy are employed in fabricating such a tube.

The use of thin films or foils of hydrogen-permeable material has marked commercial advantages over the use of thin-walled metal tubes. A foil diffuser operable under conditions of 450° C. and 150 p.s.i.g. inlet pressure can be made as thin as 0.5 to 1 mil in thickness, provided a suitable porous backing material is used to support the foil. If 0.8 mil thick palladium-25% silver diffusion foils are used, 22.8 square inches of diffusion surface are equivalent to the 114 square inches of cross section for the 4-mil tubing described above, and would supply the same 27—30 s.c.i.h. flow of diffused hydrogen. It is readily seen that as few as three, 3-inch foil disks would provide approximately the same output of pure hydrogen as the 25 feet of tubing, with resultant savings in metal cost, compactness and simplicity of construction.

In the case of leakage either in construction or operation of a tubing diffuser, it is necessary to reconstruct the entire unit, including the welded or brazed tubing joints to its headers. A defective tube must be replaced or, if many tubes are bundled to a single header, at least must be sealed off at the header with loss of capacity of apparatus. In the case of leakage through the foil of foil diffusers repair requires simply opening the apparatus at the gasket of the leaking foil, replacing the foil, and reassembling.

As previously discussed, foils or films of hydrogen-permeable metals are generally supported by porous backings, and gasketed around the peripheral edges of the foil to provide leak-proof seals so that the flow of feed and outlet gases is controlled and directed to spaces or chambers on appropriate sides of the foil. Such peripheral gasketing results in the foil being maintained in fixed position relative to the support or backing, and generally the inlet gas pressure forces the foil into close contact with the supporting material.

The present invention is concerned with the solution of a problem that has been encountered in the utilization of hydrogen diffusion apparatus, whether of the tubing or foil type hereinbefore described. It has been found that, as a result of alternately heating and cooling the hydrogen-permeable metal, and as a result of admitting and removing hydrogen during the normal course of operating (and/or shutting down) hydrogen diffusion units, the tubes or foils are subjected to expansions or contractions which are different from that of the supports to which they are fastened and which lead to tremendous forces being exerted upon the relatively thin metal barriers employed in such apparatus. Tubular diffusion elements, particularly those of spiral configuration, are adapted to expand and contract and thus to relieve some of the stress encountered. Nevertheless, expansion and contraction of the diffusion barrier relative to the fixed ends of such tubular elements sets up stresses which can eventually result in development of cracks in the diffusion barrier.

In the case of diffusion elements consisting of thin supported foils of hydrogen-permeable noble metals, such differential expansion and contraction leads to wrinkling of the thin foils. Because palladium and palladium-based alloys expand considerably in the presence of hydrogen, the membranes expand relative to their backings and must either bow out of the plane of their support or wrinkle. The differential pressure precludes bowing. The wrinkles become permanently set and put the entire membrane in tension when hydrogen is removed. Penholding and tearing occur at the vertices of the wrinkles. The resultant porous membrane as distinguished from the pore-less but permeable membrane, can not be employed for diffusion separation of hydrogen. The problem of foil rupture is particularly troublesome when exceedingly thin foils are used to attain maximum hydrogen diffusion rates.

In normal operation, diffusion apparatus for effecting the separation or purification of hydrogen from gaseous mixtures containing hydrogen is operated at elevated temperatures, generally above about 300° C. and preferably from about 400° C. to about 600° C.

It has now been found that the undesirable effects of expansion of the barriers used for hydrogen diffusion can be eliminated by effecting the cooling of such barrier materials in an atmosphere substantially free of hydrogen. While it is not intended to provide herewith any theory for the above-described behavior, it appears that cooling of metal barrier films in the presence of hydrogen permits absorbtion of hydrogen by the metal, and results in an expansion of the film. By removal of hydrogen from contact with the noble metal barrier during cooling, as for example in shutting down hydrogen diffusion apparatus, this undesirable expansion is avoided and the barrier is not subjected to undesirable and destructive stresses.

In the utilization of thin barriers of hydrogen-permeable metals for hydrogen separation and/or purification, it has further been found that minor stresses may be introduced into the barrier in spite of operation of the diffusion unit in the manner contemplated by this invention. In a preferred method of operating, diffusion units employing such barrier means, especially thin foils or membranes of metals such as palladium or palladium alloys which are employed for hydrogen diffusion at temperatures between about 300° C. and about 500° C. are heated to a temperature between about 500° C. and 800° C., and preferably between about 550° C. and 700° C. to effect annealing of the film and to remove all stresses therefrom. In the event the diffusion apparatus is operated at a temperature above about 500° C., such annealing of the film is inherent, and in such case the film need only be freed of contact with hydrogen prior to cooling to ambient temperature. The combination of heating barrier films to elevated temperatures and cooling in the absence of hydrogen permits normal thermal contraction of a strong, smooth membrane to its original size in pore-free condition.

The present invention is applicable to the operation of diffusion apparatus employing metal barriers such as nickel, platinum, palladium and alloys thereof. Palladium-silver alloys containing from 10% to 50% silver, especially palladium-25% silver, are known to provide excellent barriers for $H_2$ diffusion, and the process of the present invention is applicable to such barriers. Other alloys of nickel, platinum, or palladium, such as palladium-ruthenium alloys, can be used for $H_2$ diffusion in accordance with the method of this invention.

The invention is particularly applicable to operation of $H_2$ diffusion apparatus employing thin barriers of hydrogen-permeable membranes. In general, such apparatus uses tubes of 2 to 10 mil wall thickness, preferably 3 to 6 mil or foils of 0.2 to 5 mil thickness, preferably 0.5 to 2 mil. Heavier barrier means, such as heavy-walled tubing or thicker foils, exhibit similar undesirable expansion on cooling in the presence of hydrogen, and although the structural strength of such materials may minimize the deleterious effects of such expansion, failure of such diffusion apparatus is avoided by operation in accordance with the present invention.

The unusual phenomenon of expansion of noble metals on cooling in the presence of hydrogen is readily evident from the figures which accompany the specification.

FIGURE 1 graphically depicts temperature versus total expansion for palladium foil, in the presence and in the absence of hydrogen.

Figure 2:
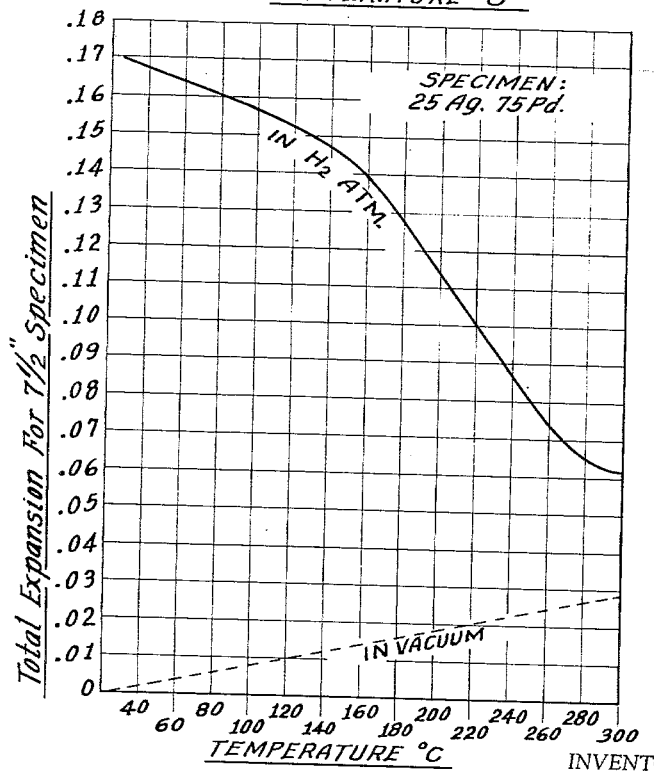

FIGURE 2 graphically depicts temperature versus total expansion for palladium-25% silver alloy in the presence and in the absence of hydrogen.

Data graphically presented in the attached figures was obtained dilatometrically using cylindrical specimens. The dilatometer chamber could be evacuated or provided with an atmosphere of controlled composition and pressure.

The dilation of the cylinder with changing temperature was transferred via a quartz pushrod to the core of a linear variable differential transformer (LVDT), which in turn caused the output of the LVDT itself to change. This output was suitably demodulated and presented to one input of a potentiometric-type of X-Y recorder. The output of a thermocouple attached to the specimen was run to the other input and dilation plotted against thermocouple E.M.F. and thus essentially against temperature.

Referring to FIGURE 1, the solid line represents the cooling curve of a palladium specimen cooled from 300° C. to ambient temperature in contact with hydrogen at 1 atmosphere. It will be noted that contraction of the metal specimen is normal in the range of about 300° C. to about 250° C. Above about 300° C., the expansion is a straight line function of temperature. At about 250° C., the normally expected foil contraction ceases and the size of the foil remains relatively constant to a temperature of about 200° C. Thereafter, expansion of the foil size is rapid as the temperature of the foil is further reduced to ambient temperature.

In contrast to this behavior, the dotted curve of FIGURE 1 shows that normal thermal contraction of a palladium foil occurs as the foil is cooled below 300° C. in the absence of hydrogen.

Similar results were obtained on a palladium-25% silver foil as shown in FIGURE 2. In this case, expansion on cooling in the presence of hydrogen begins at a temperature somewhat above 300° C.

The advantages of the present invention are obtained by removing substantially all hydrogen from contact with a metal hydrogen diffusion barrier prior to cooling such barrier below about 300° C. The removal of hydrogen from contact with the barrier can be effected by any suitable means, such as for example by evacuating the system, by purging the system with an inert gas such as nitrogen, argon, etc., or by any combination of such methods. Other methods of eliminating hydrogen from contact with the diffusion barrier can be employed.

*Example*

An 0.8 mil palladium-25% silver alloy diaphragm supported on porous carbon backing and held in place by an annular gold O ring was operated as a diffusion membrane at 455 p.s.i.a. and 350° C. The effective surface area of the diaphragm was 4.9 inches. Prior to shutting down the diffusion apparatus, the diaphragm was heated to 600° C. and hydrogen removed from contact with the diaphragm by shutting off the hydrogen feed and lowering the upstream pressure to 0 p.s.i.a. by evacuation of the downstream side of the diaphragm. The foil was then cooled to ambient temperature. This operation was repeated a number of times, and examination of the foil after such heating and cooling cycles showed no wrinkling or defects in the diaphragm.

In contrast, a foil that was operated at 350° C. followed by cooling in vacuum showed minor wrinkling and had a shorter life.

A foil that was operated at 350° C. and cooled in an atmosphere of hydrogen showed gross wrinkling and quickly developed cracks and pores.

What is claimed is:

1. A method for shutting down diffusion apparatus wherein hydrogen is separated from a gaseous mixture containing hydrogen by contacting said gaseous mixture with one side of a hydrogen-permeable noble metal membrane at a temperature between about 300° C. and about 500° C. while maintaining a pressure differential between the two sides of said membrane which method comprises heating said membrane to an elevated temperature between about 550° C. and about 800° C. and cooling said membrane in the absence of hydrogen to a temperature below about 300° C.

2. The process of claim 1 wherein said membrane is composed of a member selected from the group consisting of palladium and palladium alloys.

(References on following page)

References Cited by the Examiner

UNITED STATES PATENTS

| | | | |
|---|---|---|---|
| 1,174,631 | 3/16 | Snelling | 55—158 |
| 2,773,561 | 12/56 | Hunter | 55—16 |
| 2,824,620 | 2/58 | De Rosset | 55—16 |
| 2,911,057 | 11/59 | Green et al. | 55—158 |
| 2,958,391 | 11/60 | De Rosset | 55—16 |
| 2,962,123 | 11/60 | Darling | 55—16 |
| 3,030,798 | 4/62 | Lichtenfels | 55—386 X |
| 3,154,845 | 11/64 | Simnad | 55—16 X |

FOREIGN PATENTS

| | | |
|---|---|---|
| 796,987 | 6/58 | Great Britain. |
| 827,681 | 2/60 | Great Britain. |

OTHER REFERENCES

Metals handbook, 1948 edition, The American Society for Metals, 7301 Euclid Ave., Cleveland 3, Ohio, 1948, pp. 2, 7, 881, 1102 and 1127.

REUBEN FRIEDMAN, *Primary Examiner.*